United States Patent [19]

Paul, Jr.

[11] 4,446,883
[45] May 8, 1984

[54] END LOADED VALVE

[75] Inventor: Herman L. Paul, Jr., Lebanon, Pa.

[73] Assignee: Continental Disc Corporation, Kansas City, Mo.

[21] Appl. No.: 443,447

[22] Filed: Nov. 22, 1982

[51] Int. Cl.³ .................................................. F16K 43/00
[52] U.S. Cl. ................................ 137/315; 137/454.5; 137/DIG. 2; 251/124; 251/316; 251/360
[58] Field of Search ............... 137/315, 454.2, 454.5, 137/DIG. 2; 251/124, 125, 315, 316, 360, 361, 363

[56] References Cited

U.S. PATENT DOCUMENTS

| | | | |
|---|---|---|---|
| 117,704 | 8/1871 | Warren | 251/316 |
| 594,097 | 11/1897 | Peters | 251/360 |
| 628,779 | 7/1899 | Essex | 137/533.15 |
| 871,717 | 8/1907 | Lyter | 137/533.15 |
| 999,608 | 8/1911 | Stuckey | 137/DIG. 2 |
| 1,616,386 | 2/1927 | O'Stroske | 251/315 |
| 1,640,408 | 8/1927 | House | 251/361 |
| 1,908,440 | 5/1933 | Milton | 251/275 |
| 1,989,870 | 2/1935 | Lafferty, Jr. | 137/DIG. 2 |
| 2,629,578 | 2/1953 | Paul, Jr. | 251/124 |
| 2,629,579 | 2/1953 | Paul, Jr. | 251/320 |
| 2,666,617 | 1/1954 | Paul, Jr. | 137/271 |
| 2,923,316 | 2/1960 | Paul, Jr. | 137/489.3 |
| 3,033,227 | 5/1962 | Goldman | 251/316 |
| 3,111,299 | 11/1963 | Miller et al. | 251/316 |
| 3,223,173 | 12/1965 | Paul, Jr. | 169/76 |
| 3,264,718 | 8/1966 | Paul, Jr. | 29/157.1 R |
| 3,273,851 | 9/1966 | Rosch, Jr. et al. | 251/124 |
| 3,346,008 | 10/1967 | Scaramucci | 137/516.29 |
| 3,542,338 | 11/1970 | Scaramucci | 251/315 |
| 3,749,355 | 7/1973 | Paul, Jr. | 251/124 |
| 3,779,508 | 12/1973 | Paul, Jr. | 251/124 |

*Primary Examiner*—George L. Walton
*Attorney, Agent, or Firm*—Litman, Day & McMahon

[57] ABSTRACT

An end loaded ball valve having a fluid channel and a ball moving gate with a ball that seats against a valve seat to block passage of fluid through the valve. The valve also includes a removable retainer in the flow channel of the valve. The retainer, when in functional position in the valve, holds the valve seat in position in the valve and, when removed from the valve, allows access to the seat and the ball through the channel. The gate is designed to hold the ball during operation of the valve but to release the ball for removal through the channel for repair or replacement.

10 Claims, 7 Drawing Figures

END LOADED VALVE

BACKGROUND OF THE INVENTION

The present invention relates to ball valves, and in particular to ball valves for use in conjunction with high pressure or high temperature fluid flow. The inventive ball valve allows easy and simple removal and replacement of a ball member and seat ring, when required, without disassembly of a bonnet, a ball cage, a top cap assembly or a bottom cap assembly associated with the valve.

The valve art is highly developed and includes a wide variety of ball valves. Some of the major advances in ball valves are exemplified by the art disclosed in various United States Patents, for example: U.S. Pat. Nos. 2,629,578; 3,264,718; 3,749,355; and 3,779,508, which are related in a broad sense to the valve disclosed herein.

Conventional ball valves function well in controlling fluid flow rate and stopping flow therethrough when desired. Such valves generally comprise a valve body having a horizontal channel forming a venturi and a vertical passageway intersecting the horizontal flow channel near the center of the valve. A ball cage, containing a ball member, is reciprocably mounted within the vertical passageway and, when motivated through the passageway, permits selective flow through the valve. As the ball cage is lowered, the ball member seats against a seating ring in the flow channel, thus closing the valve. Raising the ball cage functionally moves the ball away from the valve seat and opens the valve.

A major problem with such ball valves is that the ball member and the valve seat must be periodically examined and replaced. In conventional ball valves using a movable ball cage, this requires a partial disassembly as much of the valve, possibly including the valve bonnet and seal, the cage and cage operating assembly, a top or bottom cap and seal, and any electronic components connected to the valve. Although such a disassembly for maintenance and repair does not necessarily involve a disconnection of the valve body from a fluid flow line, it does require a significant number of skilled technicians, and thus, may be very expensive and time consuming.

Additionally, it has proven to be difficult to reassemble such a ball valve in a manner precluding leaks and permitting efficient operation once the major components have been disassembled. Therefore, conventional ball valves such as those described in U.S. Pat Nos. 3,749,355 and 3,799,508, although effective, can be very difficult and expensive to maintain. Such valves are also rather complex in design and are therefore often relatively very expensive to originally purchase.

OBJECTS OF THE INVENTION

Therefore the objects of the present invention are: to provide a ball valve especially adapted for removal and replacement of the valve seat and ball; to provide such a valve in which the valve ball is enclosed within a selectively movable ball cage, the valve being selectively activated by movement of the ball cage; to provide such a valve in which removal and replacement of the valve seat and valve ball does not require disassembly of the ball cage assembly or valve bonnet; to provide such a valve in which maintenance to the ball or seat requires only disconnecting the discharge of the valve from the outlet pipe to allow access thereto; to provide such a valve in which the valve seat and ball are removable from the valve body by manipulation through a fluid flow channel in the valve; to provide such a valve in which access for removal of the valve ball and seat from the valve body is provided through an outlet flange of the valve and requires breaking of a minimum number of seats to provide such a ball valve in which removal and replacement of the valve ball and seat is cost efficient; and to provide such a valve which is relatively inexpensive to produce and maintain.

Other objects and advantages of this invention will become apparent from the following description taken in conjunction with the accompanying drawings wherein are set forth, by way of illustration and example, certain embodiments of this invention.

SUMMARY OF THE INVENTION

The ball valve of this invention comprises a valve body having a fluid flow channel therethrough comprising coaxial inlet and outlet cavity or channel portions and having a central passageway generally perpendicular to the channel and extending from the top of the valve body and communicating with the channel. A tubular seat retainer abuts against the wall defining the outlet cavity or channel and has an outlet passageway which is part of the fluid flow channel extending therethrough. The seat retainer forms an insert in the outlet channel portion and may be removed therefrom by movement along the axis of the channel in a direction away from the intersection of the outlet channel portion and the central passageway.

A valve seat ring is associated with the tubular seat retainer. The valve seat is adjacent to and circumscribes the intersection between the central passageway and the outlet channel portion. The valve seat ring and tubular seat retainer may be separate components or inserts in the outlet passageway, or alternatively, the seat and retainer may be permanently joined to one another.

The seat ring and tubular seat retainer are secured within the outlet channel portion by abutment against a stepped section of the valve body surrounding the outlet channel portion. A mating stepped section of the valve seat ring or, alternatively, the seat ring retainer prevents the valve seat ring from entering the central passageway and provides a seal which prevents fluid in the valve from escaping therefrom by flow between the valve body and the valve seat ring.

A ball cage is reciprocably mounted within the central passageway. The ball cage contains a movable ball which is adapted for a sealing engagement with the seat ring. When the valve is completely closed, the ball forms a circular line of contact seal with the seat ring.

In one embodiment, when the valve is completely assembled the portion of the channel not filled by inserts forms a venturi. The ball, in accordance Bernoulli's principle, will tend toward the center of the fluid flow and to engage the valve seat ring in a sealing relationship.

The ball cage is adapted for allowing the valve ball to partially or completely block the outlet channel portion, depending upon the location of the ball cage within the central passageway. The ball cage provides a means for securing the valve ball against the seat ring when the valve is completely closed. Additionally, the ball cage is adapted for moving the ball away from the seat ring as the valve is opened and for permitting the valve ball to be removed from the valve body when the seat ring and retention tube have been removed from the outlet channel portion.

The valve may be provided with an element, preferably a pin, which is positioned in a lower part of the valve body and is adapted to a project into the ball cage and engage the ball upon a downward sliding movement of the ball cage to position the ball on closing.

In an alternative embodiment, the inlet channel portion is adapted for retaining a second valve seat and tubular seat retainer. This allows the regeneration of the valve by rotating the valve 180 degrees and thus allowing the valve ball to contact a new valve seat.

The drawings constitute as part of this specification and include exemplary embodiments of the present invention and illustrate various objects and features thereof.

DETAILED DESCRIPTION OF THE PREFERRED EMBODIMENTS

Figure 1:
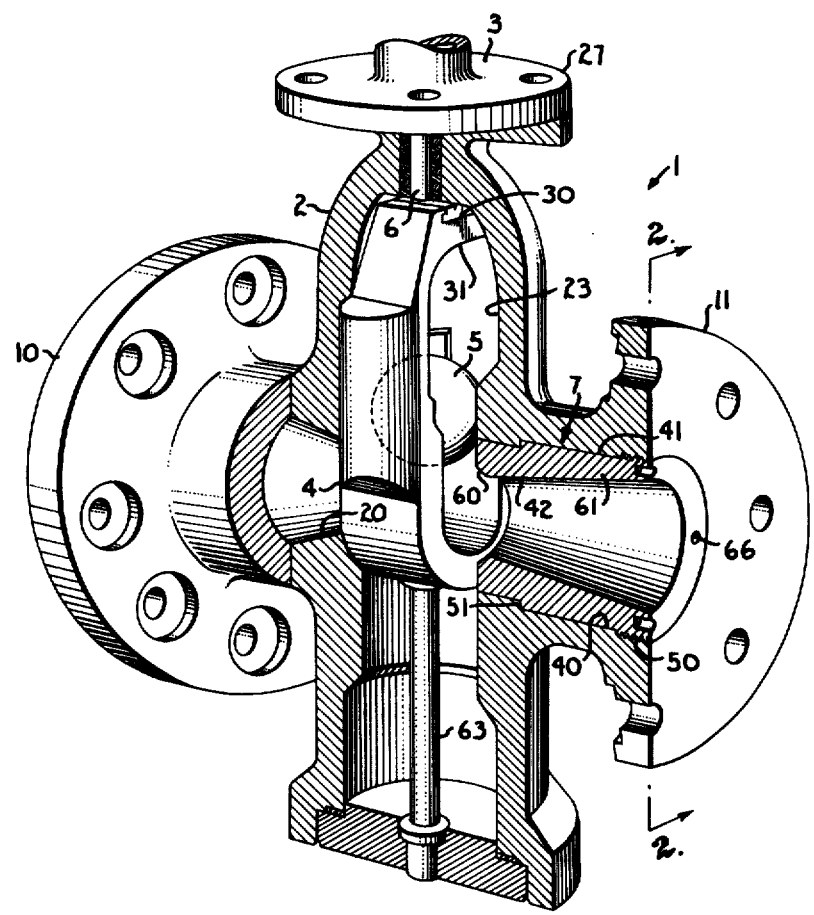
FIG. 1 is a perspective view of an end loaded ball valve according to the present invention with portions broken away to show details thereof.

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally designates a ball valve according to the present invention.

The ball valve 1 comprises a valve body 2, a bonnet 3, a ball cage 4, a valve ball 5, an operating stem 6, and a seat retainer 7.

The valve body 1 is made of a suitable metal, for example an appropriate steel alloy, and has two opposite end flanges, an inlet flange 10 and an outlet flange 11. The inlet flange 10 and the outlet flange 11 are adapted for connection to a fluid flow conduit or line by means of bolts 12 and nuts 13 or the like which connect the inlet flange 10 to an inlet line 14 and the outlet flange 11 to an outlet line 15.

Figure 2:
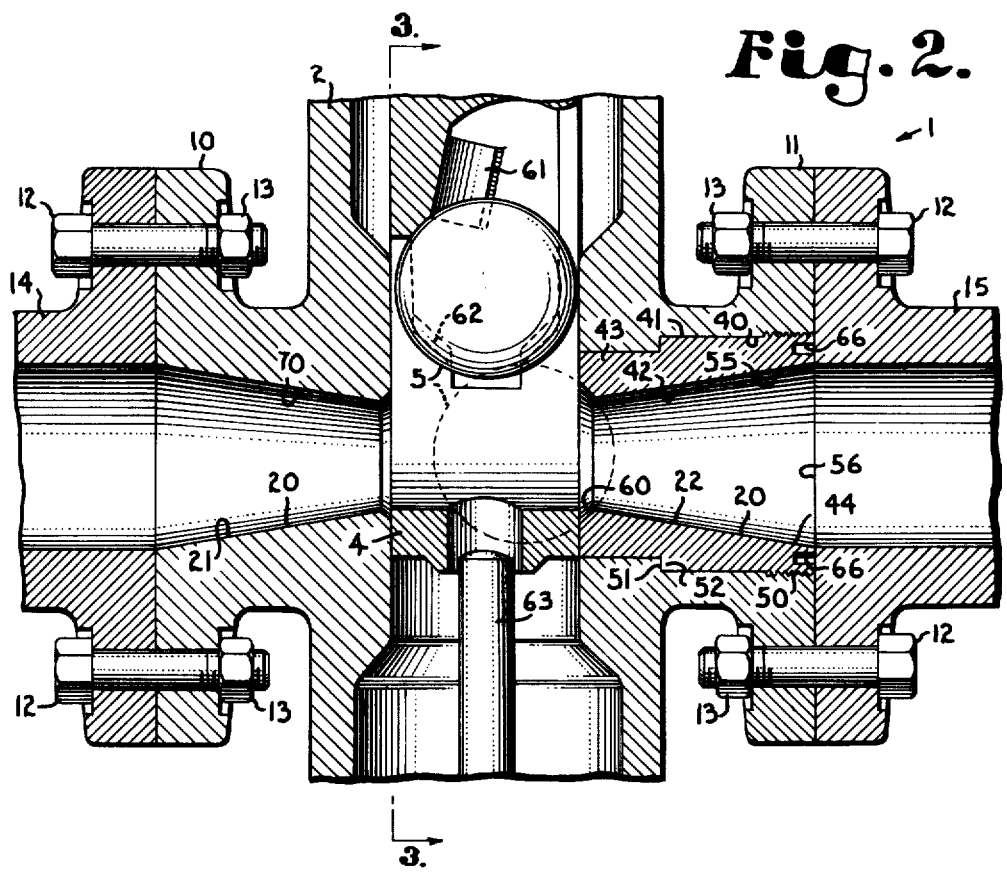
FIG. 2 is an enlarged, fragmentary cross-sectional view of the ball valve taken along line 2—2 of FIG. 1.
Figure 3:
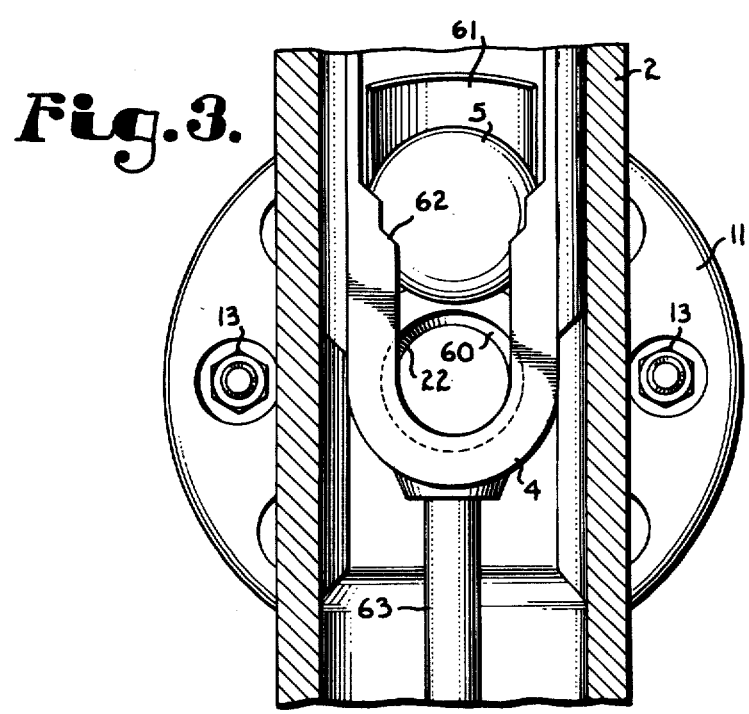
FIG. 3 is an enlarged, fragmentary cross-sectional view of the ball valve taken along line 3—3 of FIG. 2.

The valve body 2, as seen in FIG. 2, forms a horizontal channel 20 extending completely through the valve body 2 from the inlet flange 10 to the outlet flange 11. The horizontal channel 20 has two coaxial portions, an inlet channel portion 21 and an outlet channel portion 22. The valve body is also formed with a vertical passageway 23 perpendicularly intersecting the horizontal channel 20 between the inlet channel portion 21 and the outlet channel portion 22.

The bonnet 3 is also constructed of a suitable steel alloy for the intended service and is provided with a flange 27 which is coupled to the valve body 2.

The ballcage 4 is adapted to move vertically when actuated by means (not shown) such as a manual or mechanically rotated actuating wheel coaxially connected to the operating stem 6. The cage 4 has a slotted upper end 30 for slidable connection to the operating stem 6. Movement of the operating stem 6 in the vertical passageway 23 controls the position of the ball cage 4 and selectively actuates the assembled valve 1.

The valve ball 5 is contained within the ball cage 4 and is removable therefrom by passage through an opening 31 in the upper portion of the ballcage 4. The valve ball 5 is typically made of an exceptionally hard material such as an aluminum oxide or other ceramic for extended wear.

The valve body 2 forms a wall 40 which defines the outlet cavity or channel portion 22. The outlet channel portion 22 is large enough to permit passage of the valve ball 5 therethrough when the seat retainer 7 is not therein. The wall 40 defines a receiving receptacle for the seat retainer 7 which is mounted therein and is removable therefrom.

The seat retainer 7 has an exterior surface 41, an interior surface 42, a proximal end 43 and a distal end 44. The exterior surface 41 is adapted for retention of the seat retainer 7 within the outlet channel portion 22 by means of threads 50 which threadably engage a mating section of the valve wall 40 when the seat retainer 7 is entirely within the outlet channel portion 22.

The valve wall 40 defining the outlet channel 22 includes a stepped section 51. A stepped section 52 of the exterior surface 42 of the seat retainer 7 mates with the stepped portion 51 of the wall 40 when the valve 1 is assembled and forms a seal preventing fluid flow between the seat retainer 7 and the valve wall 40 and further forming a stop preventing the seat retainer from moving too far into the vertical passageway 23.

The interior surface 42 of the seat retainer 7 defines an inwardly tapering outlet flow passageway 55 providing flow communication between the intersection of the vertical passageway 23 and the horizontal channel 20 and an outlet port 56 defined by the distal end 44 of the seat retainer 7. The outlet flow passageway 55 is coaxial with the horizontal channel 20.

A seat ring 60 on the proximal end 43 of the seat retainer 7 provides for a circular line of contact seal with the valve ball 5 when the valve 1 is completely closed. The ball cage 4 includes a biasing and retaining member 61 for securing the ball 5 against the seat ring 60 when the valve 1 is completely closed. Control surfaces 62 roll the ball away from the seat ring 60 as the valve is opened. A pin 63 positioned in the lower part of the valve body 2 prevents the ball from sliding into the bottom of the vertical passageway 23 when the cage 4 is lowered.

The distal end 44 of the seat retainer 7 has cavities 66 to facilitate mounting and removing the seat retainer 7 relative to the outlet channel portion 22. The seat retainer 7 is normally mounted in the valve body 2 by means of a tool (not shown), part of which is inserted into the cavities 66 in the seat retainer 7. Rotation of the tool and the seat retainer 7 induces the threads 50 to engage the mating area of the valve wall 40 and secures the seat retainer 7 in the valve body 2.

The portion of the valve body 2 defining inlet channel portion 21 forms a wall 70 which is inwardly tapering and forms a portion of a venturi in the horizontal channel 20 when the valve 1 is assembled.

As the valve is opened, the ball cage 4 is raised ino the vertical passageway 23. The retaining member 61 moves away from the ball 5 allowing the ball 5 to move away from the seat ring 60. Control surfaces 62 roll the ball away from the seat ring 60 and fluid flow will resume through the horizontal channel 20.

At such time as it becomes necessary to inspect and possibly replace the valve ball 5 and the seat ring 60, the fluid flow into the valve 1 is stopped by occluding the flow upstream of the valve 1 and the outlet flange 11 is disconnected from the outlet line 15. Thereafter the seat retainer 7 is rotated to disengage the threads 50 from the mating section of the channel outlet portion 22 normally by means of a tool (not shown) engaging cavities 66 and being rotated. The seat retainer 7 is removed by motion in a direction coaxial with the horizontal axis of the horizontal channel 20 and away from the intersection between the outlet channel portion 22 and the vertical passageway 23. The valve ball 5 is removed from the valve 1 when the ball cage 4 is lowered and the opening 31 in the upper portion of the ball cage 4 permits the ball 5 to enter the outlet passageway defined by the wall 40 when the seat retainer 7 and seat ring 60 are removed therefrom. In this manner the valve ball 5 and seat retainer 7 may be inspected and replaced as necessary.

Figure 4:
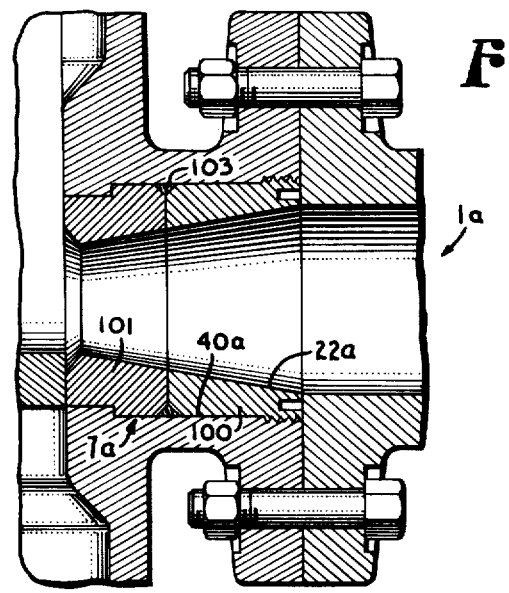
FIG. 4 is a cross-sectional view of an outlet portion of a first alternative embodiment of the ball valve.

FIG. 4 discloses an alternative embodiment of a valve 1a which is similar to valve 1. Similar numerals are used with reference to valves 1 and 1a for similar parts except that the numerals of the present embodiment are followed by the suffix "a" in which a seat retainer 7a is of two-piece construction. A seat retention bushing 100 retains a seat portion 101 in abutting relation to a wall 40a surrounding an outlet channel 22a. Gasket 103 provides a sealing mechanism between the seat retention bushing 100 and the seat portion 101.

Figure 5:
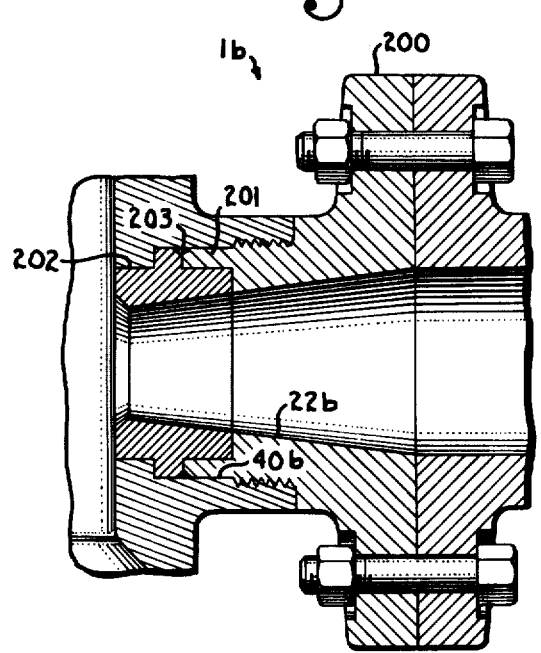
FIG. 5 is a cross-sectional view of an outlet portion of a second alternative embodiment of the ball valve.

FIG. 5 discloses a second alternative embodiment of a valve according to the present invention generally designated by the numeral 1b which has some similar parts to the valve 1. Similar parts in the vales 1 and 1b are given the same reference numeral except those related to the latter are followed by the suffix "b". The valve 1b has a removable outlet flange 200. The outlet flange 200 has a retention portion 201 which retains a seat portion in abutting relationship against a wall 40b surrounding an outlet channel 22b. A gasket 203 provides a sealing mechanism between the seat retention portion 201 and the seat portion 202.

Figure 6:
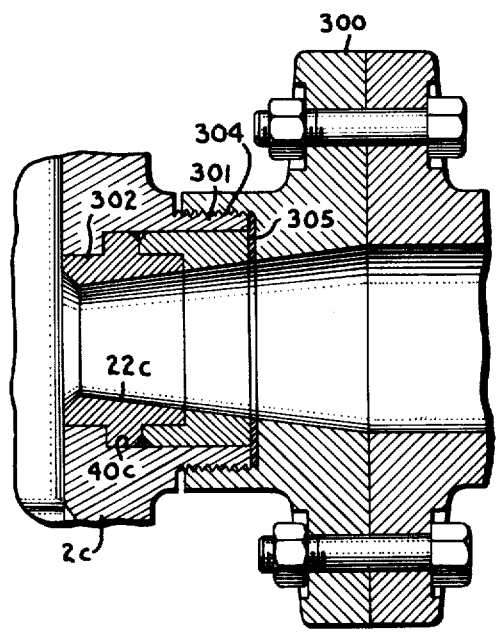
FIG. 6 is a cross-sectional view of an outlet portion of a third alternative embodiment of the ball valve.

FIG. 6 discloses a third alternative embodiment of a valve according to the present invention generally designated by the reference numeral 1c which is simmilar in construction and operation to the valve 1. Similar parts in valves 1 and 1c are designated by the same reference numeral except the latter includes the suffix "c". The valve 1c has a removable outlet flange 300. The outlet flange 300 retains a bushing 301 and seat portion 302 in abuttment against a wall 40c surrounding an outlet channel 22c. A gasket 303 provides for a sealing relationship between the bushing 301 and seat portion 302. Threads 304 provide for mounting of the flange 300 on a valve body 2c. Gasket 305 operates as a sealing mechanism between the flange 300 and the valve body 2c.

Figure 7:
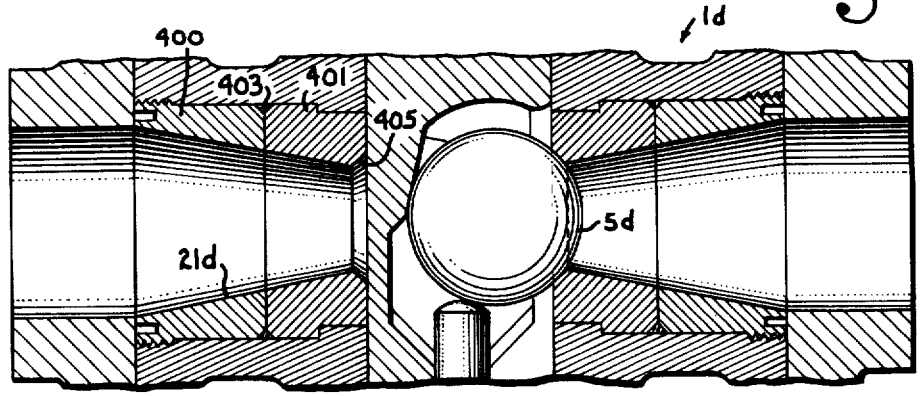
FIG. 7 is a cross-sectional view of a fourth alternative embodiment of the ball valve.

FIG. 7 discloses a fourth alternative embodiment of a valve according to the present invention generally designated by the reference numeral 1d. The valve 1d is similar to the valve 1 in construction and operation. Similar parts in valves 1 and 1d are designated by the same reference numeral except that the numerals of the latter are followed by the suffix "d". The valve 1d has an inlet channel 21d enclosing a seat retention bushing 400 and seat portion 401. A gasket 403 provides function as a sealing mechanism between the bushing 400 and seat portion 401. The seat portion 401 has a seat ring 405 which provides circular line of contact seal with the valve ball 5d when abutting thereagainst. In this embodiment the valve 1d may be regenerated by rotation of the valve 180 degrees, causing the inlet channel 21d to become an outlet channel.

It is to be understood that while certain forms of the present invention have been illustrated and described herein, it is not to be limited to the specific forms or arrangement of parts described and shown.

What is claimed and desired to secure by Letters Patent is as follows:

1. In a ball valve comprising a valve body having therein a fluid flow channel and a valve ball having a closed position associated therewith wherein flow of fluid through said flow channel is blocked by sealing engagement of the ball with a seat ring circumscribing an outlet portion of the flow channel and a plurality of open positions wherein fluid is allowed to flow through the flow channel; the ball being removably retained within a ball cage mounted within the valve body to reciprocate generally perpendicularly relative to said channel so as to selectively motivate the ball through each of the positions and being freely rotatable within said cage; wherein the improvement comprises:

(a) a removable insert for selectively positioning within said valve and surrounding the outlet portion of said flow channel when placed in said valve body and having retention means associated therewith for retaining said insert within said valve body when said valve is operational; said seat ring being removable through said channel when said insert is removed from said channel and said seat being held in a fixed position by said insert when said valve is operational; said valve body further including a wall surface spaced from and generally surrounding said outlet portion of said flow channel and defining a cavity having a diameter at least sufficiently large to permit passage of said seat ring and said ball therethrough when said insert is removed therefrom; and (b) said ball cage including an aperture therein sufficiently large to allow passage of said ball therethrough; said cage being movable when said valve is non-operational to a position such that said aperture is aligned with said cavity to allow removal of said ball from said cage and valve body through said cavity when said insert and seat ring are removed from said cavity.

2. The valve according to claim 1 wherein:

(a) said seat ring and said retention means are a continuous annular member snugly mating with said cavity of said valve body.

3. The valve according to claim 1 wherein:

(a) said cage includes means thereon to retain said ball within said gate except when said aperture is aligned with said cavity.

4. The valve according to claim 3 wherein:

(a) said aperture is not aligned with said cavity when said ball valve is in any of the various open positions associated therewith.

5. A valve having generally coaxial and joined inlet and outlet passages therethrough and having a flow channel within said passages; said valve further comprising:
 (a) a valve body having a top end, a bottom end, and a valve passageway extending downwardly from said top of said valve body and generally perpendicular to said passages; said valve passageway communicating with said passages;
 (b) inlet connection means at an inlet end of said inlet passage and being adapted for connection to an inlet flow line;
 (c) outlet connection means at an outlet end of said inlet passage and being adapted for connection to an outlet flow line;
 (d) a ball cage mounted within said valve passageway; said cage being selectively movable within said valve passageway to reciprocate generally perpendicularly to said passages; said cage including an aperture therein;
 (e) a valve ball removably retained within said ball cage and being freely rotatable therein; said ball reciprocating with said cage when said valve is operational so as to control flow of fluid through said outlet passage; said ball being removable from said cage through said cage aperture;
 (f) said outlet passage having an outlet wall circumscribing and defining an outlet cavity;
  (1) said outlet cavity further surrounding and being spaced from an outlet flow channel; said cavity having a diameter throughout sufficiently large to permit passage of said valve ball therethrough;
 (g) a removable and replaceable tubular seat retainer having a proximal end, a distal end, an external surface, an internal surface and having a functional position wherein said retainer is mounted within said outlet cavity in such a way as to form a liner relative to said outlet channel wall;
  (2) said retainer having retaining means associated therewith for retaining said seat retainer in the functional position thereof within said outlet channel;
  (2) said internal surface of said seat retainer defining a portion of said outlet channel when said retainer is mounted within said cavity;
 (h) valve seating means associated with said proximal end of said first seat retainer providing for a sealing relationship with said valve ball when said valve is in a closed position; said retainer retaining said seating means in a fixed position relative to said cavity when in the functional position thereof;
 (i) means operably connected to said ball cage for reciprocating same between a closed position and a plurality of open positions thereof;
  (1) said ball cage further having retaining means for retention of said valve ball against said seating means when said ball cage is in the closed position thereof, whereby said valve is closed;
  (2) said ball cage having urging means for biasing of said ball away from said first seating means when said ball cage is in one of said open positions thereof, whereby said valve is opened;
  (3) said ball cage aperture permitting removal of said valve ball therefrom through said outlet passage when said ball cage is in said closed position and said seat retainer is removed from said valve body.

6. The valve according to claim 5 wherein:
 (a) said outlet wall has a stepped portion associated therewith; said stepped portion forming a shoulder in said outlet cavity such that said outlet cavity has a smaller diameter nearer said valve passageway than said outlet connector means;
 (b) said seat retainer external surface has a second stepped portion associated therewith thereon snugly mating with said outlet wall stepped portion when said retainer is in the functional position thereof so as to form a seal to fluid flow between said retainer and said outlet wall and providing a stop such that said retainer is mounted in a proper position relative to said outlet cavity.

7. The valve according to claim 5 wherein:
 (a) said inlet passage is a mirror image of said outlet passage such that said valve may be selectively rotated 180 degrees to allow said inlet passage to become and function as said outlet passage and receive said retainer therein.

8. A valve according to claim 5 wherein:
 (a) said seat retainer comprises two portions, a seat portion and a seat retention bushing;
  (1) said seat portion having said first seating means thereon and said second stepped portion associated therewith;
  (2) said seat retention bushing having said retention means associated therewith and being adapted for forming a sealing relationship with said seat portion whereby fluid is prevented from flowing between said seat retainer and said outlet wall.

9. A valve according to claim 8 wherein:
 (a) said outlet connection means is an outlet flange connected to said seat retention bushing and is removable from said valve body therewith.

10. A valve according to claim 5 wherein:
 (a) said seat retainer comprises a seat portion and a seat retention bushing;
  (1) said seat portion having said first seating means and said second stepped portion associated therewith;
  (2) said seat retention bushing is adapted for forming a sealing relationship with said seat portion whereby said seat portion is retained within said outlet cavity and fluid is prevented from flowing between said retainer and said outlet wall;
 (b) said outlet connection means is an outlet flange removably connected to said valve body and including said retainer means for retaining said seat retained within said valve body.

* * * * *